(12) United States Patent
Cui

(10) Patent No.: US 12,383,843 B2
(45) Date of Patent: Aug. 12, 2025

(54) CHILDREN'S RIDE-ON VEHICLE

(71) Applicant: Henry's Toy Box, Inc., Irvine, CA (US)

(72) Inventor: Rongzhi Cui, Irvine, CA (US)

(73) Assignee: Henry's Toy Box, Inc., Irvine, CA (US)

( * ) Notice: Subject to any disclaimer, the term of this patent is extended or adjusted under 35 U.S.C. 154(b) by 0 days.

(21) Appl. No.: 18/960,620

(22) Filed: Nov. 26, 2024

(65) Prior Publication Data

US 2025/0083062 A1    Mar. 13, 2025

Related U.S. Application Data

(63) Continuation-in-part of application No. 18/784,405, filed on Jul. 25, 2024, now Pat. No. 12,304,553,
(Continued)

(51) Int. Cl.
*A63H 17/38* (2006.01)
*A45C 9/00* (2006.01)
(Continued)

(52) U.S. Cl.
CPC .............. *A63H 17/38* (2013.01); *A47L 11/28* (2013.01); *A47L 11/4066* (2013.01);
(Continued)

(58) Field of Classification Search
CPC ... A63H 17/36; A63H 17/38; A45C 2009/005
See application file for complete search history.

(56) References Cited

U.S. PATENT DOCUMENTS 3,316,993 A * 5/1967 Weitzner ................. A45C 9/00
  180/209
4,095,816 A * 6/1978 Langieri ................ A63H 33/00
  280/87.021
(Continued)

FOREIGN PATENT DOCUMENTS

BR        83020209 U  *  5/2005
CN       201457665 U  *  5/2010
(Continued)

OTHER PUBLICATIONS

Translation MU83020209U (Year: 2005).*
(Continued)

*Primary Examiner* — Eugene L Kim
*Assistant Examiner* — Alyssa M Hylinski
(74) *Attorney, Agent, or Firm* — KW Law, LLP

(57) ABSTRACT

A children's ride-on vehicle includes a vehicle body comprising a substantially rectangular shape, a steering wheel, a front wheel assembly, a steering column, and a seat located above a storage compartment. The steering wheel has a substantially rectangular shape. The seat comprises a flat panel. The plane of the seat is coplanar with the top surface of the vehicle body. The vehicle comprises a connecting frame. The connecting frame is telescopically connected to the vehicle body. The vehicle comprises a removably connected cleaning attachment. The vehicle can be converted to a piece of luggage.

16 Claims, 12 Drawing Sheets

Related U.S. Application Data which is a continuation-in-part of application No. 17/810,780, filed on Jul. 5, 2022.

(60) Provisional application No. 63/218,707, filed on Jul. 6, 2021.

(51) Int. Cl.
*A47L 11/28* (2006.01)
*A47L 11/40* (2006.01)
*A63H 17/26* (2006.01)
*A63H 29/22* (2006.01)

(52) U.S. Cl.
CPC .......... *A63H 17/264* (2013.01); *A63H 29/22* (2013.01); *A45C 2009/005* (2013.01)

(56) References Cited

U.S. PATENT DOCUMENTS

| | | | | |
|---|---|---|---|---|
| 4,654,918 A * | 4/1987 | Cooper | ............... | A47L 11/4058 15/49.1 |
| 5,207,440 A * | 5/1993 | Liang | ............... | A45C 13/262 280/47.11 |
| 5,432,416 A * | 7/1995 | Tae-Sig | ............... | B25J 5/007 318/587 |
| 5,549,501 A * | 8/1996 | Jow | ............... | A63H 17/262 446/466 |
| 6,619,677 B2 * | 9/2003 | Wei | ............... | B62K 9/00 280/87.021 |
| 7,070,191 B2 * | 7/2006 | Wang | ............... | B62M 1/00 280/87.051 |
| 7,222,866 B1 * | 5/2007 | Cahoj | ............... | B62B 3/007 280/30 |
| 8,887,340 B2 | 11/2014 | Pedlar et al. | | |
| 9,015,887 B1 | 4/2015 | Pedlar et al. | | |
| 9,661,905 B2 * | 5/2017 | O'Donnell | ............... | A45C 5/03 |
| D907,868 S | 1/2021 | Bearup et al. | | |
| D912,738 S | 3/2021 | Flesher | | |
| 2005/0132527 A1 * | 6/2005 | Pedlar | ............... | A47L 11/305 15/340.3 |
| 2006/0048532 A1 * | 3/2006 | Beal | ............... | B62B 5/085 62/239 |
| 2009/0065491 A1 * | 3/2009 | Fitzgerald | ............... | B62J 33/00 219/204 |
| 2017/0336785 A1 | 11/2017 | Young et al. | | |
| 2018/0078868 A1 * | 3/2018 | Mueller | ............... | A63H 30/04 |
| 2018/0264372 A1 * | 9/2018 | Bernbaum | ............... | A63G 19/00 |
| 2023/0010524 A1 | 1/2023 | Cui et al. | | |

FOREIGN PATENT DOCUMENTS

| | | | | |
|---|---|---|---|---|
| CN | 202847908 U | * | 4/2013 | |
| CN | 204815680 U | * | 12/2015 | |
| CN | 108903178 A | * | 11/2018 | ............... A45C 5/04 |
| CN | 210592278 U | * | 5/2020 | |
| CN | 212047553 U | * | 12/2020 | |
| CN | 212995032 U | * | 4/2021 | |
| CN | 113276934 A | | 8/2021 | |
| CN | 217415995 U | * | 9/2022 | |
| DE | 20110143 U1 | * | 2/2002 | ........... A47L 7/0085 |
| EP | 1782147 B1 | | 7/2010 | |
| JP | H0436952 U | * | 3/1992 | |
| KR | 200463041 Y1 | * | 10/2012 | ............... B62K 9/02 |
| WO | 2000028149 A1 | | 5/2000 | |
| WO | WO-2020024007 A1 | * | 2/2020 | .......... A47L 11/4069 |

OTHER PUBLICATIONS

Translation CN212047553U (Year: 2020).*
Translation CN202847908U (Year: 2013).*
Translation CN2014457665U (Year: 2010).*
Rolly Toys, "Front Sweeper Add on Kit for Kids Pedal Tractor," retrieved on Nov. 20, 2024 from <https://kidstractors.co.uk/front-sweeper-add-on-kit-for-kids-pedal-tractor/> (3 pages).
Rolly Toys, "Add on Road Sweeper for Kids Ride on Pedal Tractor," retrieved on Nov. 20, 2024 from <https://kidstractors.co.uk/add-on-road-sweeper-for-kids-ride-on-pedal-tractor/> (3 pages).
Jiesk, "Ride-on Vacuum Floor Sweeper 55" Cleaning Path DC 48V AGM Battery 40 GAL Dustbin Capacity, 8 GAL Water tank," retrieved on Nov. 20, 2024 from <https://tinyurl.com/bmbrbr24> (5 pages).
Actev, "Arrow Smart Kart," retrieved on Nov. 20, 2024 from <https://actevmotors.com/arrow-smart-kart/> (2 pages).
Delta, "Installation: How do I set the adjustable rotational limit stop on my bath or shower?," retrieved on Nov. 20, 2024 from <https://support.deltafaucet.com/s/article/How-do-I-set-the-adjustable-rotational-limit-stop-on-my-bath-or-shower-1628028366789> (3 pages).
Moen, "Stop Tube Posi-Temp 1-Handle," retrieved on Nov. 20, 2024 from <https://www.bestplumbingspecialties.com/products/99103380/> (2 pages).

* cited by examiner

CHILDREN'S RIDE-ON VEHICLE

CROSS-RELATED APPLICATIONS

This application is a continuation in part of U.S. patent application Ser. No. 18/784,405 filed on Jul. 25, 2024, which is a continuation in part of U.S. patent application Ser. No. 17/810,780 filed on Jul. 5, 2022, both of which are incorporated herein by reference. This application also claims priority to Chinese Patent Application No. 202323561570.1 filed on Dec. 26, 2023 and Chinese Patent Application No. 202122341739.7 filed on Sep. 27, 2021, both of which are incorporated herein by reference.

FIELD OF THE INVENTION

The present invention relates generally to children's ride-on vehicles. More specifically, the present invention is a children's ride-on vehicle including a quick-release steering wheel.

BACKGROUND OF THE INVENTION

Children's ride-on vehicles are reduced-scale vehicles that are designed and sized for use by children. Typically, children's ride-on vehicles include at least one seat adapted to accommodate one or more children and steering and drive assemblies that are adapted to be operated by a child sitting on the seat. The drive assembly that is often used in children's ride-on vehicles includes a battery-powered motor that is adapted to drive the rotation of one or more of the vehicle's wheels.

In prior art, the steering wheel is installed by placing it onto the steering shaft. The steering shaft has a square shape, and both the steering shaft and the steering wheel are equipped with threaded holes. The installation is completed by aligning the corresponding bolts with the threaded holes and then tightening the bolts using a screwdriver. However, this method is cumbersome when installing and removing the steering wheel and requires installation tools to complete the installation and removal.

Therefore, it is an objective of the present invention to provide a children's ride-on vehicle with a quick-release steering wheel which overcomes the problems set forth above.

SUMMARY OF THE INVENTION

The present invention discloses a children's ride-on vehicle with a quick-release steering wheel. The children's ride-on vehicle comprises a vehicle body, a steering wheel, a shaft, a front wheel assembly, and a threaded rod. The steering wheel comprises a connecting member. The shaft at a first end comprises a first mating element. The connecting member comprises a first complementary mating element configured to mate with the first mating element in a complementary manner to allow coupling and decoupling of the steering wheel on the shaft. The vehicle body comprises an interior space to accommodate the front wheel assembly. The front wheel assembly is rotatably mounted on the vehicle body. The shaft at a second end comprises a second mating element. The front wheel assembly comprises a second complementary mating element configured to mate with the second mating element in a complementary manner to allow coupling and decoupling of the front wheel assembly on the shaft. The front wheel assembly, the shaft, and the connecting member of the steering wheel each comprise a central passage to form a continuous passage for the threaded rod. The central passage of the connecting member of the steering wheel is threaded to allow the threaded rod to be threaded into the connecting member.

BRIEF DESCRIPTION OF THE DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the present invention. That is, the dimensions of the components of the present invention, independently and in relation to each other can be different. It should be noted that the drawings are schematic and not necessarily drawn to scale. Some drawings are enlarged or reduced to improve drawing legibility.

DETAIL DESCRIPTIONS OF THE INVENTION

Figure 1:
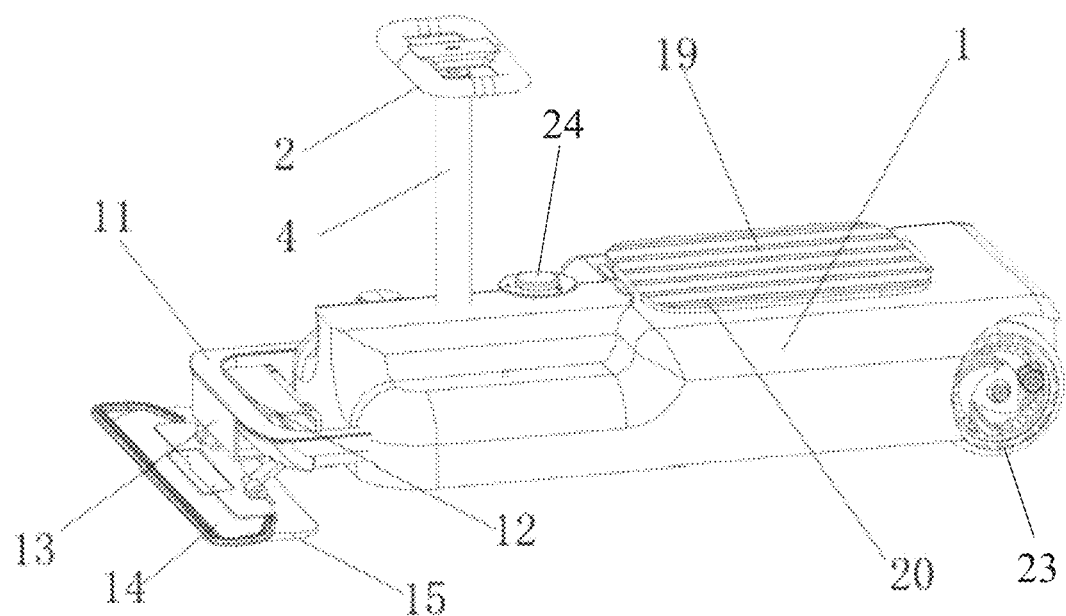
FIG. 1 depicts a perspective view of the present invention.
Figure 2:
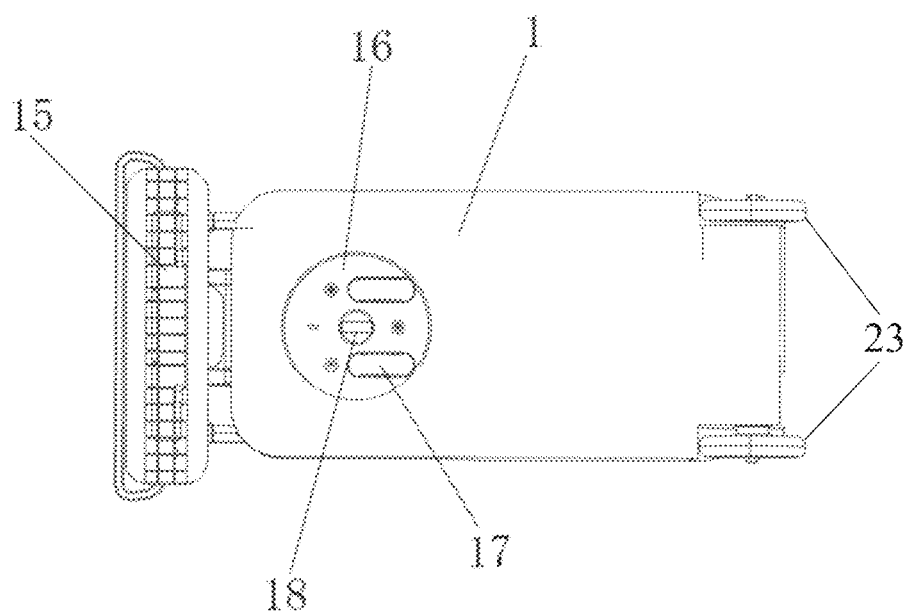
FIG. 2 depicts a bottom view of the present invention.
Figure 3:
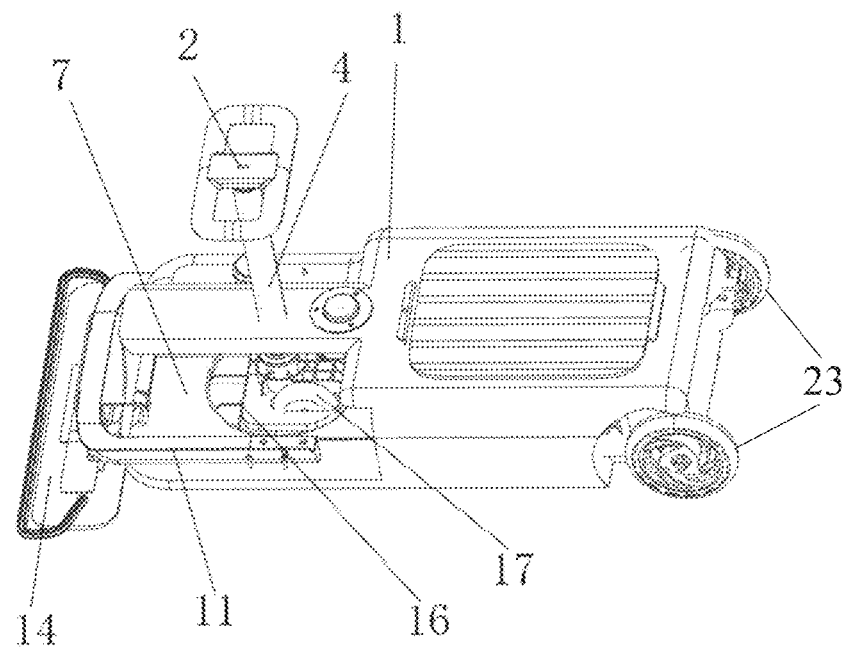
FIG. 3 depicts a perspective view of the present invention, wherein the interior space of the children's ride-on vehicle is shown.
Figure 4:
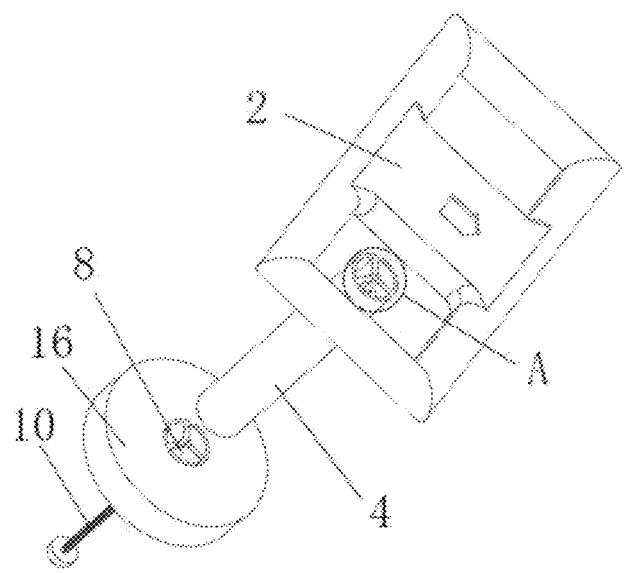
FIG. 4 depicts an exploded perspective view of the quick-release steering wheel of the present invention.
Figure 5:
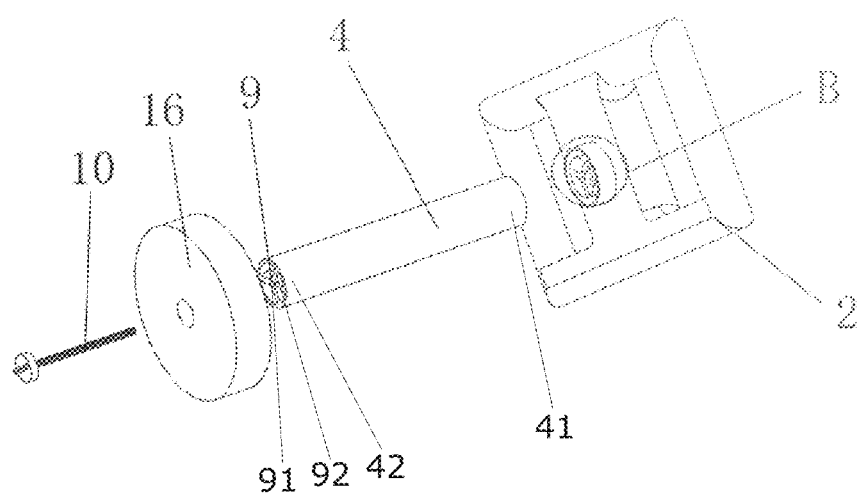
FIG. 5 depicts another exploded perspective view of the quick-release steering wheel of the present invention.
Figure 6:
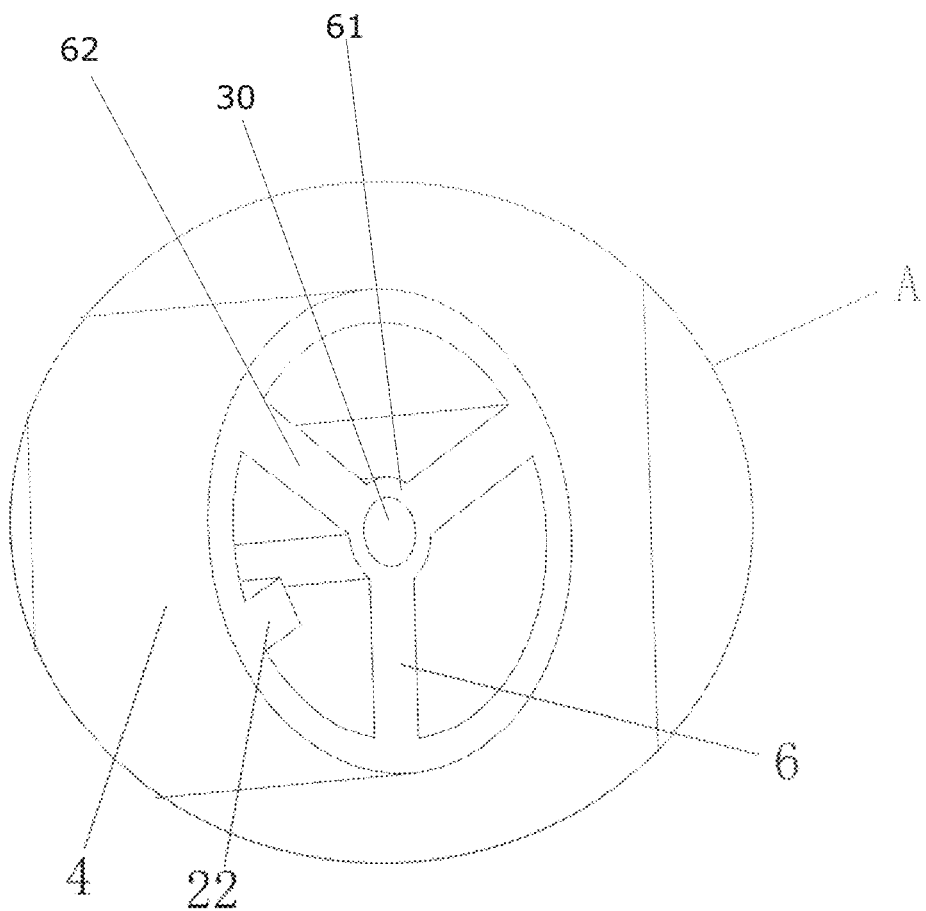
FIG. 6 depicts an enlarged view of the area A in FIG. 4 of the present invention.
Figure 7:
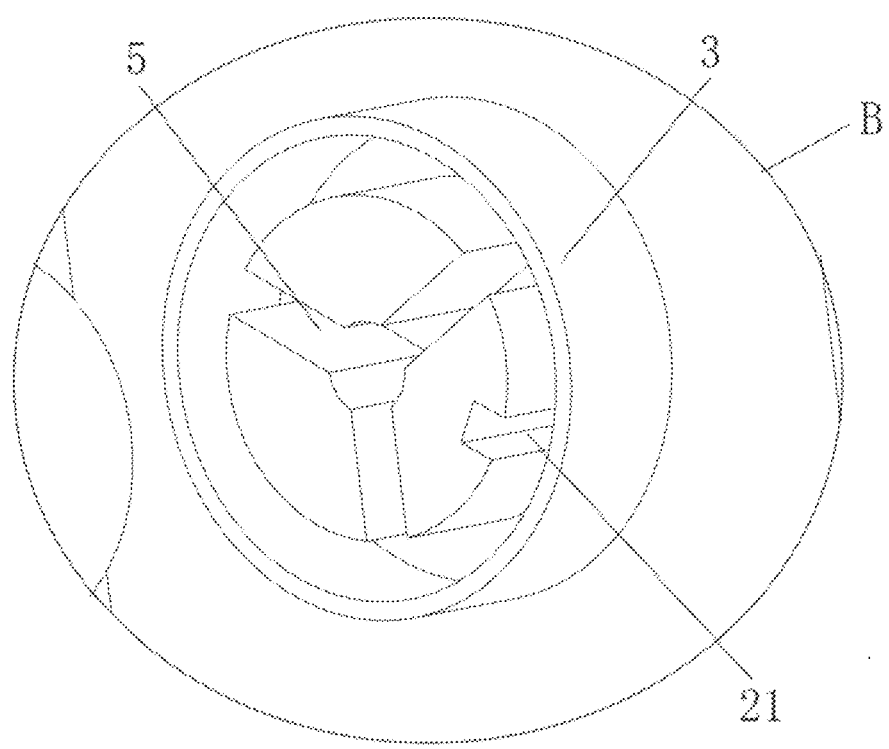
FIG. 7 depicts an enlarged view of the area B in FIG. 5 of the present invention.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and is made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. When not explicitly defined herein, to the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subject matter disclosed under the header.

Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise indicated, the drawings are intended to be read together with the specification and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure as the particular drawing figure faces the reader. Similarly, the terms "inwardly," "outwardly" and "radially" generally refer to the orientation of a surface relative to its axis of elongation, or axis of rotation, as appropriate. As used herein, the term "proximate" refers to positions that are situated close/near in relationship to a structure. As used in the following description, the term "distal" refers to positions that are situated away from positions.

The present disclosure includes many aspects and features. Moreover, while many aspects and features relate to, and are described in the context of children's ride-on vehicles, embodiments of the present disclosure are not limited to use only in this context.

Referring now to the figures of the present disclosure. As shown in FIGS. 1-7, the children's ride-on vehicle with a quick-release steering wheel of the present invention comprises a vehicle body 1, a steering wheel 2, a shaft 4, a front wheel assembly 16, and a threaded rod 10.

The vehicle body 1 is configured to accommodate most of the components of the present invention and provide a seat 19 to the user. It should be noted that the vehicle body 1 can be of any shape, size, material, features, type or kind, orientation, location, quantity, components, and arrangements of components that would allow the present invention to fulfill the objectives and intents of the present invention. In one embodiment, the vehicle body 1 comprises an interior space to accommodate the front wheel assembly 16. The front wheel assembly 16 is rotatably mounted on the vehicle body 1. In one embodiment, the front wheel assembly 16 comprises at least one front wheel 17. In one embodiment, the seat 19 comprises a plurality of anti-slip elements 20 to prevent the user from accidentally slipping over the vehicle body 1.

The steering wheel 2 comprises a connecting member 3. The shaft 4 at a first end 41 comprises a first mating element 6. The connecting member 3 comprises a first complementary mating element 5 configured to mate with the first mating element 6 in a complementary manner to allow coupling and decoupling of the steering wheel 2 on the shaft 4. In a preferred embodiment, the first mating element 6 is an insert comprising a central portion 61 and at least one radial arm 62 extending outwardly from the central portion 61, while the first complementary mating element 5 is a groove. In the illustrated embodiment, the at least one radial arm 62 comprises three arms that are evenly spaced apart at an angle of 60 degrees. In another preferred embodiment, the shaft 4 at the first end 41 further comprises a positioning lug 22, and the connecting member further comprises a positioning groove 21 to receive the positioning lug 22. In this way, it is ensured that the steering wheel 2 is attached to the shaft 4 in the correct position.

Similarly, the shaft 4 at a second end comprises a second mating element 9. The front wheel assembly 16 comprises a second complementary mating element 8 configured to mate with the second mating element 9 in a complementary manner to allow coupling and decoupling of the front wheel assembly 16 on the shaft 4. In one embodiment, the second mating element 9 is an insert comprising a central portion 91 and at least one radial arm 92 extending outwardly from the central portion, while the second complementary mating element 8 is a groove. In the illustrated embodiment, the at least one radial arm 92 comprises three arms that are evenly spaced apart at an angle of 60 degrees. In another preferred embodiment, the shaft 4 at the second end 42 may further comprise a positioning lug, and the front wheel assembly 16 may comprise a positioning groove to receive the positioning lug. In this way, it is ensured that the front wheel assembly 16 is attached to the shaft 4 in the correct position.

In one embodiment, the front wheel assembly 16, the shaft 4, and the connecting member 3 of the steering wheel 2 each comprising a central passage 30 to form a continuous passage for the threaded rod. Moreover, the central passage 30 of the connecting member 3 of the steering wheel 2 may be threaded to allow the threaded rod 10 to be threaded into the connecting member 3. Therefore, with the threaded rod 10 traveling through the front wheel assembly 16, the shaft 4, and the connecting member 3 of the steering wheel 2 and threaded into the connecting member 3, the front wheel assembly 16, the shaft 4, and the connecting member 3 are securely attached together. In one embodiment, the threaded rod 10 comprises a rotary button 18 at a bottom end. the rotary button 18 allows the user to conveniently tighten or loosen the threaded rod 10. In use, when the user rotates the steering wheel 2, the front wheel assembly 16 is rotated too and thus can change the movement direction of the vehicle body 1.

In one embodiment, the present invention further comprises a cleaning attachment 15, a mounting bracket 13, and a connecting frame 11. The connecting frame 11 is attached to the vehicle body 1. Preferably the connecting frame 11 is telescopically attached to the vehicle body 1. The cleaning attachment 15 is attached onto the mounting bracket 13 via a connecting plate 14. The mounting bracket 13 comprises a mounting groove 12 through which the mounting bracket 13 is attached to the connecting frame 11. It should be noted that the cleaning attachment 15 could be any other suitable cleaning attachment, including but not limited to mop heads, vacuum cleaners, sweepers, dust-collecting devices, etc.

The present invention allows the user to conveniently install and/or remove the steering wheel 2, the shaft 4, and the threaded rod 10 without any tools. Moreover, the cleaning attachment 15 and the mounting bracket 13 may also be removed from the connecting frame 11. In this way, the present invention can be rapidly converted into a piece of luggage. The removed components may be stored in a storage compartment beneath the seat 19.

Figure 8:
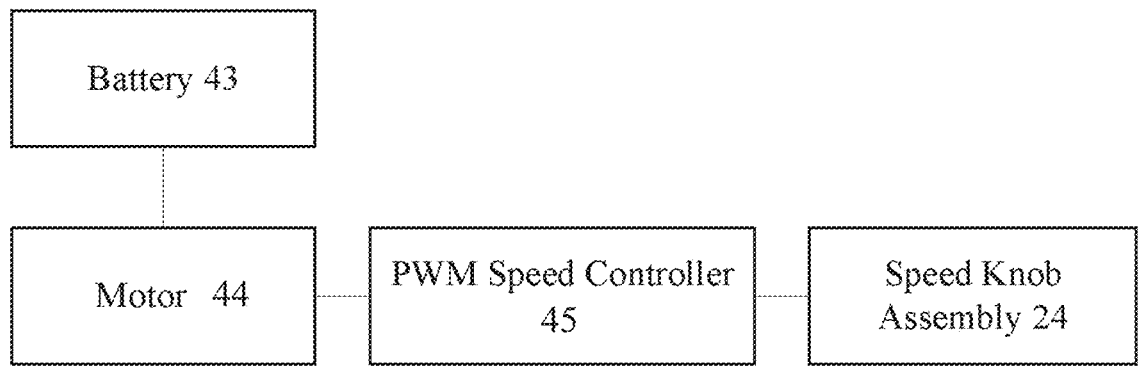
FIG. 8 depicts a block diagram of the speed control device of the present invention.
Figure 9:
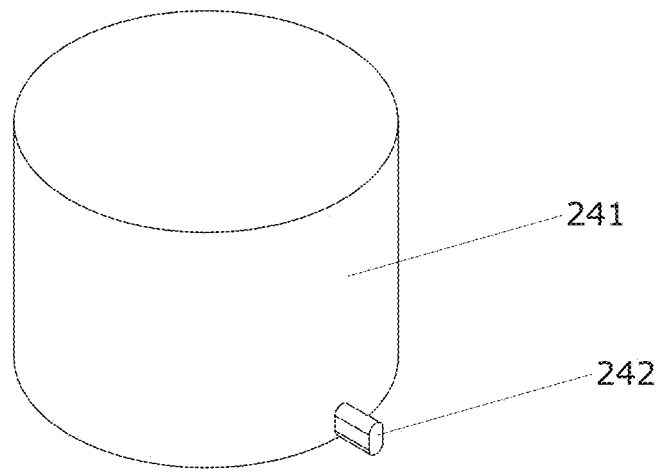
FIG. 9 depicts a perspective view of a knob of the present invention.
Figure 10:
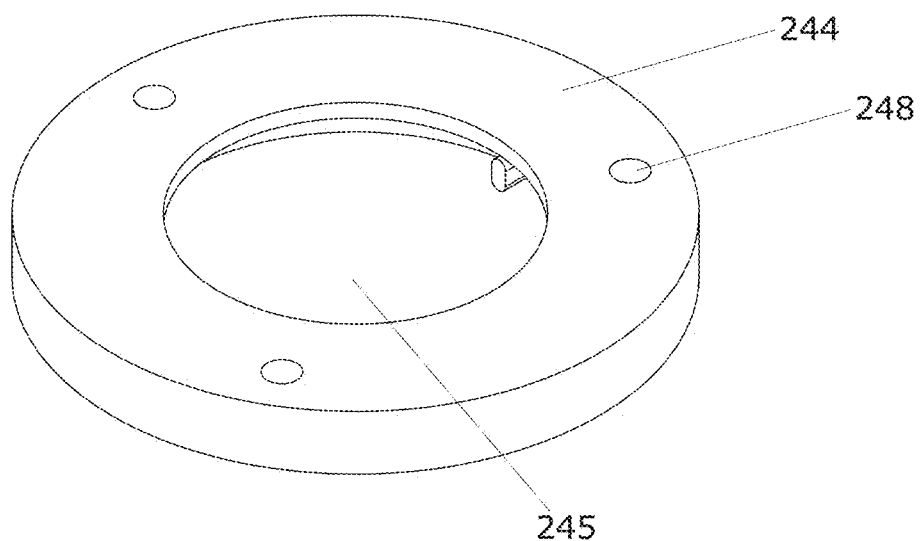
FIG. 10 depicts a perspective view of a maximum speed limiting mechanism of the present invention.
Figure 11:
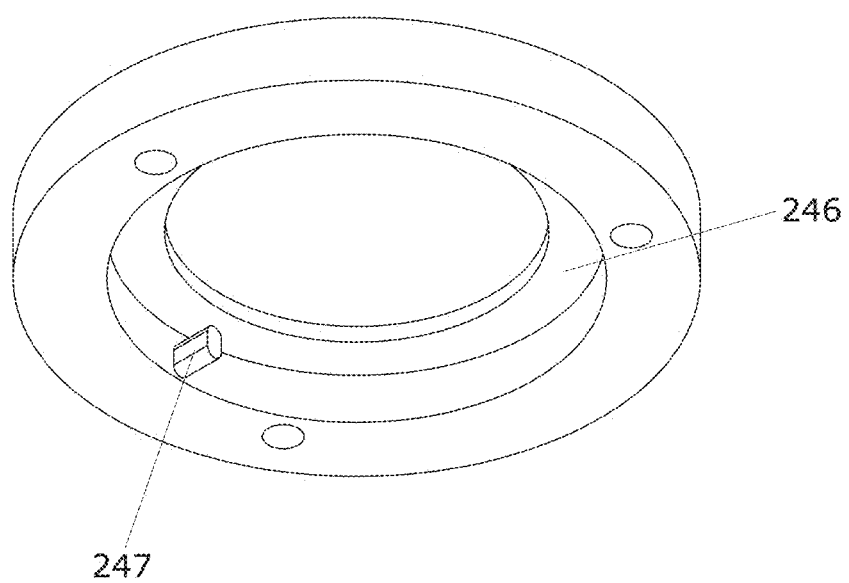
FIG. 11 depicts another perspective view of the maximum speed limiting mechanism of the present invention.
Figure 12:
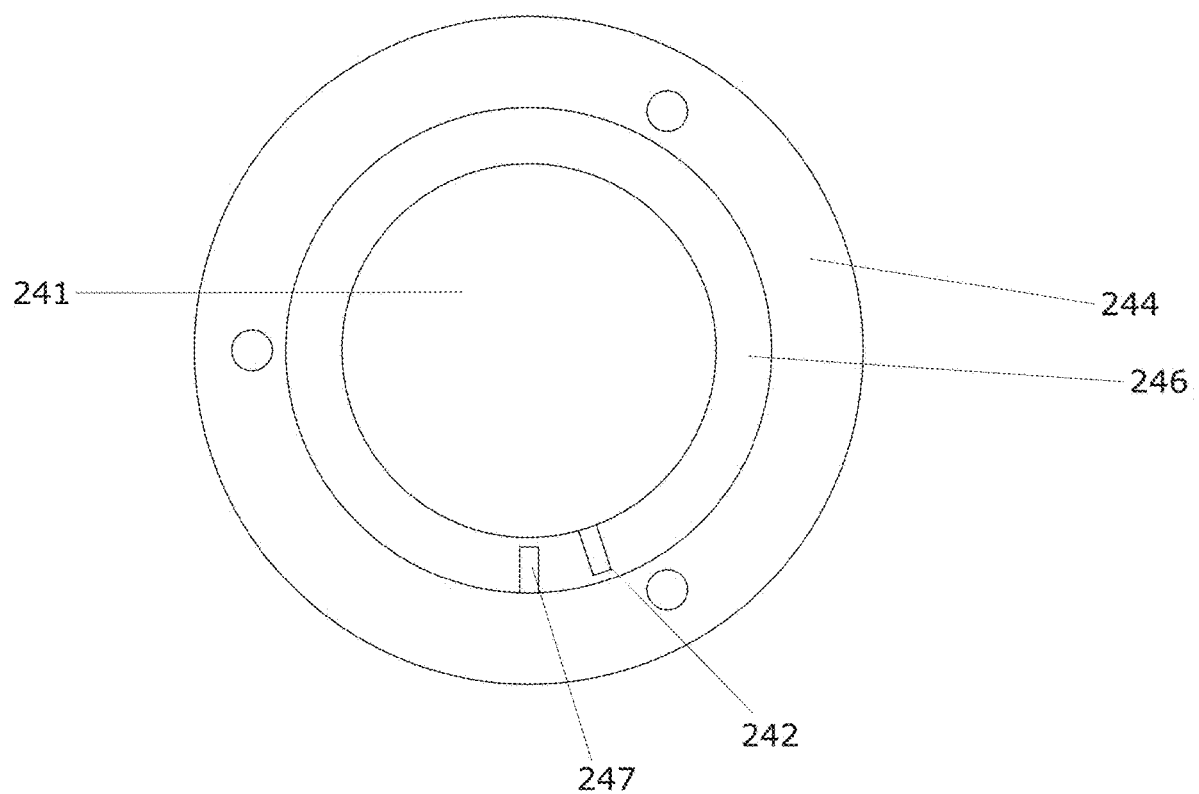
FIG. 12 depicts a perspective view of a knob assembly of the present invention.

In one embodiment, the present invention further comprises a plurality of rear wheels 23. The rear wheels may be driving wheels. In one embodiment, as shown in FIG. 8, the present invention further comprises a Pulse Width Modulation (PWM) speed controller 45, a speed knob assembly 24, and a motor 44. The motor 44 is coupled to the plurality of rear wheels 23 and configured to drive the plurality of rear wheels 23. The PWM speed controller 45 is configured to control a rotary speed of the motor 44 according to an input of the speed knob assembly 24. In one embodiment, the present invention further comprises a battery 43. The battery 43 is electrically connected to the motor 44. The battery 43 is preferably a rechargeable lithium-ion battery, nickel metal hydride battery, nickel cadmium battery, lithium iron phosphate battery, etc.

As shown in FIGS. 1 and 9-12, the speed knob assembly 24 is configured to adjust the movement speed of the present invention. In one embodiment, the speed knob assembly 24 comprises a knob 241 and a maximum speed limiting mechanism 244. The knob 241 comprises a knob protrusion 242. The maximum speed limiting mechanism 244 comprises an opening 245, a circular groove 246, and a plurality of mounting holes 248. The opening 245 allows the knob 241 to travel through. The circular groove 246 is configured to allow the knob protrusion 242 to move while the knob 241 is rotated. The circular groove 246 comprises a limiting protrusion 247 to stop the knob protrusion 242 of the knob 241. The plurality of mounting holes 248 are evenly spaced apart around the maximum speed limiting mechanism 244. Although three mounting holes are shown in the illustrated embodiment, it should be noted that a different number of mounting holes is also contemplated. By rotating the maximum speed limiting mechanism 244 and mounting it onto the vehicle body 1, the limiting protrusion 247 can be placed at different locations to limit the rotary angle of the knob 241 and thus can adjust the maximum speed of the present invention.

Although the disclosure has been explained in relation to its preferred embodiment, it is to be understood that many other possible modifications and variations can be made without departing from the spirit and scope of the disclosure.

What is claimed is:

1. A children's ride-on vehicle comprising:
a vehicle body;
a steering wheel;
a front wheel assembly comprising front wheel assembly wheels adapted to contact a floor surface;
a shaft connecting the steering wheel to the front wheel assembly;
a seat;
a connecting frame;
a cleaning attachment removably connected to the connecting frame; and
drive wheels adapted to contact the floor surface;
wherein the vehicle body comprises a rectangular shape having a top surface defining a top surface plane and a bottom surface defining a bottom surface plane;
wherein the vehicle body comprises a storage compartment beneath the seat;
wherein the front wheel assembly is rotatably mounted to the vehicle body; and
wherein the front wheel assembly comprises a circular plate located in a position coplanar with the bottom surface plane of the vehicle body and within the bottom surface of the vehicle body;
wherein the cleaning attachment comprises a plate having a planar lower surface and an upper surface comprising a mounting bracket having a mounting groove configured to receive and attach to a lower side of the connecting frame; and
wherein the vehicle is configured so the planar lower surface of the cleaning attachment contacts the floor surface during operation of the vehicle.

2. The children's ride-on vehicle according to claim 1, wherein the steering wheel has a rectangular shape.

3. The children's ride-on vehicle according to claim 2, wherein the steering wheel is symmetrical in two planes.

4. The children's ride-on vehicle according to claim 1, wherein the seat comprises a flat panel defining a seat plane, and wherein the seat is located on the top surface of the vehicle body.

5. The children's ride-on vehicle according to claim 4, wherein the seat comprises a plurality of anti-slip elements.

6. The children's ride-on vehicle according to claim 4, wherein the seat plane and the top surface plane have a parallel configuration.

7. The children's ride-on vehicle according to claim 1, wherein the seat consists essentially of a flat panel defining a seat plane, and wherein the seat plane and the top surface plane have a coplanar configuration.

8. The children's ride-on vehicle according to claim 1, wherein the top surface of the vehicle body comprises two recessed portions separated by a longitudinal portion of the vehicle body having an upper longitudinal portion surface; and wherein the upper longitudinal portion surface is coplanar with the top surface of the vehicle body.

9. The children's ride-on vehicle according to claim 8, wherein the shaft is located in the upper longitudinal portion surface of the vehicle body.

10. The children's ride-on vehicle according to claim 9, wherein the vehicle comprises a speed knob assembly located in the upper longitudinal portion surface of the vehicle body between the shaft and the seat.

11. The children's ride-on vehicle according to claim 1, wherein the vehicle comprises a speed knob assembly comprising:
  a maximum speed limiting mechanism comprising a ring-shaped bezel defining a knob opening; and
  a knob located in the knob opening.

12. The children's ride-on vehicle according to claim 11, wherein the knob comprises a knob protrusion, wherein the maximum speed limiting mechanism comprises a circular groove, the circular groove being configured to allow the knob protrusion to move while the knob is rotated, and the circular groove comprising a limiting protrusion to stop the knob protrusion.

13. The children's ride-on vehicle according to claim 1, wherein the connecting frame is telescopically attached to the vehicle body, and wherein the connecting frame is configured so that the vehicle may be converted to a piece of luggage upon removal of the cleaning attachment from the connecting frame.

14. The children's ride-on vehicle of claim 13, wherein the vehicle is configured so that a user can install and remove the steering wheel and shaft without tools.

15. The children's ride-on vehicle of claim 14, wherein the storage compartment is configured to store at least one of the steering wheel, shaft, cleaning attachment, and mounting bracket.

16. The children's ride-on vehicle of claim 1, wherein the cleaning attachment is wider than the vehicle body.

\* \* \* \* \*